Feb. 21, 1950 J. R. BOYKIN 2,498,242
CONTROL SYSTEM
Filed March 23, 1945
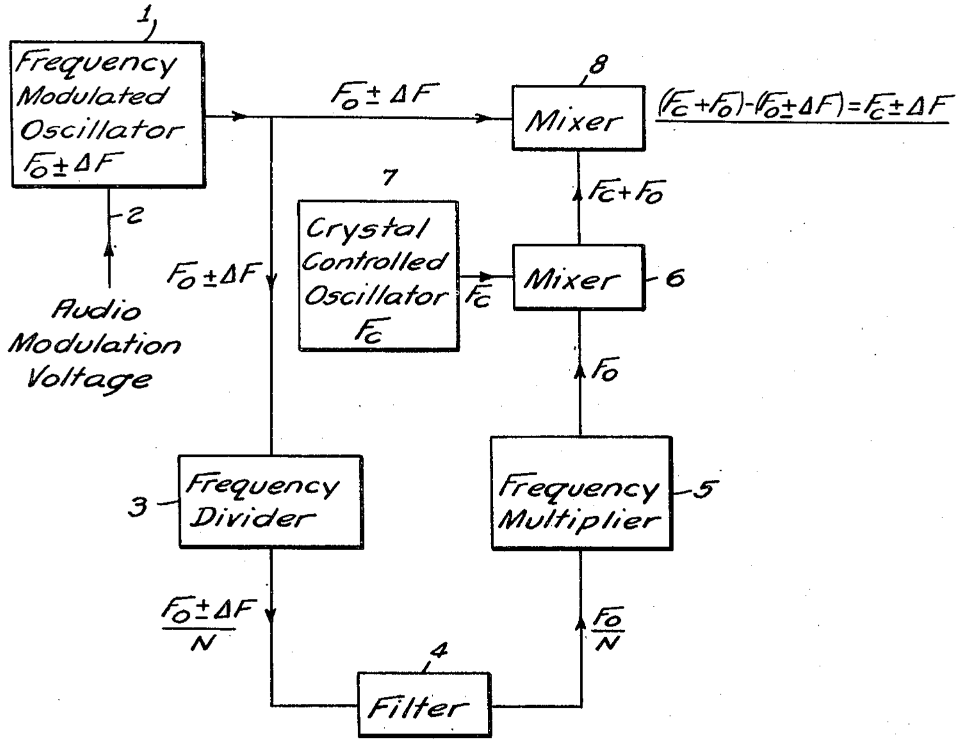
INVENTOR
John R. Boykin.
BY F. W. Lyle.
ATTORNEY Patented Feb. 21, 1950 2,498,242

UNITED STATES PATENT OFFICE 2,498,242

CONTROL SYSTEM

John R. Boykin, Baltimore, Md., assignor to Westinghouse Electric Corporation, East Pittsburgh, Pa., a corporation of Pennsylvania Application March 23, 1945, Serial No. 584,403

11 Claims. (Cl. 332—19)

My invention relates to radio telephone systems and in particular relates to such systems which employ frequency modulation.

Radio telephone systems which are frequency modulated rather than amplitude modulated have substantial advantages in the nature of freedom from static and other unwanted noises. However the production of a system in which an output wave of constant amplitude deviates in frequency from a fixed frequency, frequently referred to as the center frequency, in proportion to the amplitude of modulating signals has posed a difficult technical problem of which the prior art offers no solution at once simple, economical and satisfactory. For example, the most widely used method of generating an output wave which deviates in frequency from a center frequency by an amount proportional from instant to instant to a modulating signal, is probably that described in paragraphs 8 of section 9 of the "Radio Engineers Handbook" by Terman, McGraw-Hill Book Company, New York, 1942, First edition, which employs a so-called reactance tube to determine the instantaneous frequency of an oscillation generator. However, this system suffers from the defect that the normally constant center frequency actually varies, or "drifts," to a substantial amount from time to time. Since the receivers for frequency modulated waves are designed to operate upon a transmission which presupposes absolute constancy of the center frequency, the drifting of the center frequency results in unsatisfactory reception.

One object of my invention is to provide a system for generating a frequency modulated transmission wave in which the center frequency remains far more constant than is obtainable by such systems as that just mentioned.

Another object of my invention is to provide a generator of frequency modulated waves for its center frequency having the high degree of constancy which is characteristic of crystal controlled oscillation generators and which shall be simpler and less costly and complicated than frequency modulation generators of the prior art.

Other objects of my invention will become apparent upon reading the following description taken in connection with the drawing in which the single figure is a block diagram of one system capable of carrying out the broad principles of my invention.

Briefly stated, I produce an output wave having a frequency which deviates from a center frequency $F_c$ by an amount $\pm\Delta F$ which is proportional from instant to instant to the amplitude of a modulating signal, by first generating a frequency modulated wave in which the center frequency $F_0$ is subject to some unwanted variation in accordance with the prior art; dividing the frequency of this wave; filtering the wave to remove all components except a sub multiple of the center frequency $F_0$; then multiplying this center frequency to its original value; then mixing the resulting wave with a carrier wave produced by a crystal controlled oscillator of substantially invariable frequency $F_c$; then mixing the resulting output with the output of the first-mentioned generator in such a way as to eliminate the somewhat variable original center frequency $F_0$ and leave an output wave having the frequency $F_c$ of the crystal controlled oscillator varied in accordance with the signal modulations $\pm\Delta F$.

Turning in detail to the drawings which show one satisfactory arrangement for carrying out the foregoing steps, a frequency modulated oscillator 1 which may be of the type referred to in the above-mentioned paragraph in turn produces an output of substantially constant amplitude but which has a frequency $F_0\pm\Delta F$, where $F_0$ is the nominally constant, but actually somewhat variable, center frequency and $\pm\Delta F$ is a frequency proportional from instant to instant to the audio frequency modulating voltage input at 2. A portion of the output of the oscillator 1 is fed to a frequency divider 3 of any suitable type well known in the art which has an output equal to $$\frac{F_0\pm\Delta F}{N}=\frac{F_0}{N}\pm\frac{\Delta F}{N}$$

where N is a constant. The value of N is preferably made such that $$\frac{\Delta F}{N}$$

is somewhat less than 2.4 times the lowest audio frequency $F_L$, which is to be impressed on the input tube. Under such conditions, it can be shown that the frequency modulated wave is equivalent to a complex wave made up of a nominal center frequency $$\frac{F_0}{N}$$

together with side bands of which none will be nearer to the center frequency than $F_L$. The methods of computing the amplitudes of the center frequency band and side bands into which a frequency modulated wave may be resolved is described in section 7, paragraph 16 of Terman above mentioned.

The output of the frequency divider 3 is then passed through a filter 4 having a pass band of a width somewhat less than $F_L$ on each side of the last-mentioned center frequency $$\frac{F_0}{N}$$

This filter will accordingly substantially exclude all side bands and transmit only the center frequency, $$\frac{F_0}{N}$$

The output of the filter 4 is fed through a frequency multiplier 5 which gives an output current which has a frequency equal to N times its input frequency. The output of the frequency multiplier 5 is accordingly $F_0$, and is fed into a mixer 6 of any suitable type well known in the art. The mixer 6 is likewise supplied with current of rigorously constant frequency $F_c$, from a crystal controlled oscillator 7 of a type well known in the art. From the output of the mixer 6 it is thus possible to derive a current having a frequency $F_c+F_0$ and this is fed into a second mixer 8. The mixer 8 is likewise supplied with the current of frequency $F_0\pm\Delta F$ from the output of the oscillator 1. From the output of the mixer 8 is derived, by methods well known in the art, a current having a frequency $$(F_c+F_0)-(F_0\pm\Delta F)=F_c\pm\Delta F$$

In other words, the arrangement is such that in the mixer 8 the currents of frequency $F_0$ cancel each other and there is produced a frequency modulated wave which varies about a rigorously constant frequency $F_c$ of the crystal controlled oscillator 7 by an amount proportional to the audio modulating voltage input 2.

It will be noted that the frequency of the original oscillator 1 may drift through a frequency range which is N times the band width of the filter 4 without adversely effecting operation of my system.

While, to comply with the patent statutes, I have described a particular circuit arrangement capable of carrying out the broad principles of my invention, it will be apparent to those skilled in the art that the general procedural steps of (1) generating a frequency modulated current of center frequency $F_0$, deriving from this current another current not modulated in frequency and of the center frequency $F_0$, generating a current of rigorously constant frequency $F_c$ and suitably mixing the three currents thus mentioned to eliminate the current of frequency $F_0$ may be carried out with other arrangements than those which I have specifically described.

I claim as my invention:

1. The method of generating a frequency modulated wave having a rigorously constant center-frequency which comprises generating a frequency modulated wave having a center-frequency which may vary, producing a current which has the frequency just mentioned divided by a constant N, filtering the current last mentioned to remove substantially all side bands, frequency multiplying the current produced by said filtering by N, and mixing the current resulting from said frequency multiplication, the original frequency modulated wave and a current of rigorously constant frequency to produce an output having the form of a frequency modulated wave of rigorously constant center-frequency.

2. The method of generating a frequency modulated wave having a rigorously constant center-frequency which comprises generating a frequency modulated wave having a center-frequency which may vary, producing a current which has the frequency just mentioned divided by N, filtering the current last mentioned to remove substantially all side bands, frequency multiplying the current produced by said filtering by N, and mixing the current resulting from said frequency multiplication, the original frequency modulated wave and a current of rigorously constant frequency to produce an output having the form of a frequency modulated wave of rigorously constant center-frequency, where N is greater than the frequency swing of the first-mentioned wave divided by 2.4 times the lowest audio frequency at which the first-mentioned wave is modulated.

3. In combination with a source of modulating voltage, a wave generator frequency-modulated by said modulating voltage, a frequency divider supplied from the output of said generator, a filter for the output of said frequency divider having a band width less than twice the lowest frequency present in said modulating voltage, a frequency multiplier for the output of said filter, a crystal controlled oscillator, a mixer producing an output frequency equal to the sum of the frequencies of said crystal controlled oscillator and said frequency multiplier, a second mixer supplied from said generator and from the first-mentioned mixer and arranged to produce a frequency equal to the difference of the frequencies of the first-mentioned mixer and said generator.

4. In combination with a source of modulating voltage, a wave generator frequency-modulated by said modulating voltage, a frequency divider supplied from the output of said generator, a filter for the output of said frequency divider having a band width less than twice the lowest frequency present in said modulating voltage, a frequency multiplier for the output of said filter, a crystal controlled oscillator, a mixer producing an output frequency equal to the sum of the frequencies of said crystal controlled oscillator and said frequency multiplier, a second mixer supplied from said generator and from the first-mentioned mixer and arranged to produce a frequency equal to the difference of the frequencies of the first-mentioned mixer and said generator, said frequency divider and said frequency multiplier each acting to cause a frequency change between input and output in a ratio at least equal to the frequency swing of said generator divided by 2.4 times the lowest audio frequency present in said modulating voltage.

5. The method of generating a frequency modulated wave having a rigorously constant center-frequency which comprises generating a frequency modulated wave having a center-frequency which may vary, deriving from said wave a wave having substantially only the last-mentioned center-frequency, mixing the last-mentioned wave with a wave having a rigorously fixed frequency to produce a wave having a frequency equal to the sum of the frequencies of the two waves last mentioned, mixing the last-mentioned wave with a wave of the frequency first mentioned to produce a frequency-modulated wave having a center-frequency equal to said rigorously fixed frequency.

6. In combination with a source of modulating voltage, a generator producing a center-frequency which is modulated by said modulating voltage, means for filtering from an output current of said generator a current having said center frequency, a source of rigorously fixed frequency current, means for deriving from said source and the output of said generator a current having a frequency equal to the sum of said rigorously fixed frequency and said center-frequency, and means for deriving from the last-mentioned current and the output current of said generator, a current having a frequency which has the form of said rigorously controlled frequency modulated in accordance with said modulating voltage.

7. In combination with a generator producing a frequency-modulated carrier wave, filter means supplied with current from the output of said generator and proportioned to produce an output current having the center-frequency of said generator, a source of rigorously fixed frequency, a first mixer for mixing the output of said source and the output of said filter to produce a current having a frequency equal to the sum of the frequencies of said source and the center-frequency of said generator, and a second mixer supplied with the output of said first mixer and the output of said generator and proportioned to produce a current having an output frequency equal to said rigorously fixed frequency when frequency-modulated in accordance with said modulating voltage.

8. In combination with a frequency-modulated oscillator having a constant amplitude output of frequency $F_0 \pm \Delta F$ where $F_0$ is a center frequency likely to undergo fluctuation and $\Delta F$ is a frequency modulation thereof, a frequency divider supplied from the output of said oscillator, and having an output of frequency $$\frac{F_0 \pm \Delta F}{N}$$

where N is a constant, a filter supplied from the output of said frequency divider and having a band width somewhat less than twice the lowest frequency used to modulate said source, a frequency multiplier having an output frequency which is N times that of its input supplied with the output of said filter, a generator of rigorously fixed frequency $F_c$, a mixer supplied from the output of said generator and the output of said frequency multiplier and proportioned to produce an output frequency $F_c + F_0$ and a second mixer supplied from the output of the first mentioned mixer and the output of said source and proportioned to produce an output frequency $F_c \pm \Delta F$.

9. In combination with means for producing a frequency modulated wave having a center-frequency which may vary, means for producing a current having a frequency equal to the frequency of said wave divided by a constant N, means for filtering the current last mentioned to remove substantially all side bands therefrom, means for frequency multiplying the output current from said filter by N, means for producing a current of rigorously constant frequency, and means for mixing said current of constant frequency with the output of said means for frequency multiplying and with said frequency modulated wave to produce an output current.

10. In combination with means for producing a frequency modulated wave, means for producing a current having the frequency of said wave divided by N, means for filtering the last-mentioned current to remove substantially all side bands therefrom, means for frequency multiplying the output from said filter by N, means for producing a current of rigorously constant frequency, and means for mixing said current of constant frequency with the output of said means for frequency multiplying and with said frequency modulated wave to produce an output current, the value of N being greater than the frequency swing of said frequency modulated wave divided by 2.4 times the lowest audio frequency at which said frequency modulated wave is modulated.

11. In combination with a frequency modulated oscillator having a constant amplitude output of frequency $F_0 \pm \Delta F$ where $F_0$ is a center frequency likely to undergo fluctuation and $\Delta F$ is a frequency modulation thereof, a frequency divider supplied from the output of said oscillator, and having an output of frequency $$\frac{F_0 \pm \Delta F}{N}$$

where $$\frac{\Delta F}{N}$$

is less than 2.4 times the lowest audio frequency present in the output of said frequency modulated oscillator, a filter supplied from the output of said frequency divider and having a band width somewhat less than twice the lowest frequency used to modulate said source, a frequency multiplier having an output frequency which is N times that of its input supplied with the output of said filter, a generator of rigorously fixed frequency $F_c$, a mixer supplied from the output of said generator and the output of said frequency multiplier and proportioned to produce an output frequency $F_c + F_0$ and a second mixer supplied from the output of the first mentioned mixer and the output of said source and proportioned to produce an output frequency $F_c \pm \Delta F$.

JOHN R. BOYKIN.

REFERENCES CITED

The following references are of record in the file of this patent:

UNITED STATES PATENTS

| Number | Name | Date |
|---|---|---|
| 2,289,041 | Roberts | July 7, 1942 |